United States Patent
Oestreicher et al.

(10) Patent No.: US 10,065,273 B1
(45) Date of Patent: Sep. 4, 2018

(54) SOLDER MATERIAL, METHOD FOR THE PRODUCTION THEREOF AND USE THEREOF TO JOIN METAL SUBSTRATES WITHOUT PRESSURE

(71) Applicant: TECHNISCHE UNIVERSITAET BERLIN, Berlin (DE)

(72) Inventors: Annerose Oestreicher, Berlin (DE); Tobias Roehrich, Berlin (DE)

(73) Assignee: Nano-Join GmbH, Berlin (DE)

( * ) Notice: Subject to any disclaimer, the term of this patent is extended or adjusted under 35 U.S.C. 154(b) by 870 days.

(21) Appl. No.: 14/395,212

(22) PCT Filed: Apr. 18, 2013

(86) PCT No.: PCT/EP2013/058105
§ 371 (c)(1),
(2) Date: Mar. 19, 2015

(87) PCT Pub. No.: WO2013/156570
PCT Pub. Date: Oct. 24, 2013

(30) Foreign Application Priority Data

Apr. 20, 2012 (DE) .................. 10 2012 206 587

(51) Int. Cl.
| | |
|---|---|
| B23K 35/34 | (2006.01) |
| B23K 35/02 | (2006.01) |
| B23K 1/20 | (2006.01) |
| B23K 35/30 | (2006.01) |
| B23K 35/36 | (2006.01) |

(52) U.S. Cl.
CPC .............. *B23K 35/34* (2013.01); *B23K 1/20* (2013.01); *B23K 1/203* (2013.01); *B23K 35/025* (2013.01); *B23K 35/3006* (2013.01); *B23K 35/36* (2013.01)

(58) Field of Classification Search
CPC ... B23K 35/34; B23K 35/3006; B23K 35/025
See application file for complete search history.

(56) References Cited

U.S. PATENT DOCUMENTS

| | | | |
|---|---|---|---|
| 2008/0156398 A1 | 7/2008 | Yasuda et al. | |
| 2010/0021704 A1 | 1/2010 | Yoon et al. | |
| 2010/0051319 A1* | 3/2010 | Schmitt | B23K 35/3006 |
| | | | 174/126.1 |

FOREIGN PATENT DOCUMENTS

| | | |
|---|---|---|
| DE | 102007046901 | 4/2009 |
| DE | 102008031893 | 1/2010 |

(Continued)

OTHER PUBLICATIONS

International Search Report dated Aug. 19, 2013 in International Application No. PCT/EP2013/058105. (2 pages).

(Continued)

*Primary Examiner* — Matthew E Hoban
(74) *Attorney, Agent, or Firm* — Fox Rothschild LLP

(57) ABSTRACT

The invention relates to a silver solder paste and to a silver solder paste containing copper, which can be used to join metal or metalized substrates, in particular copper substrates, without pressure at low temperatures. The silver solder according to the invention contains a metal-organic silver complex as a precursor, which forms silver nanoparticles only upon being heated and which forms a silver-metal molten phase over a temperature range of 20 to 40 units upon being heated further, which silver-metal molten phase can be used as a process window for joining already starting at 150° C., preferably starting at approximately 200° C.

9 Claims, 3 Drawing Sheets

(56) References Cited

FOREIGN PATENT DOCUMENTS

| DE | 102009040076 | 3/2013 |
|----|--------------|--------|
| DE | 102009040078 | 9/2014 |
| EP | 2042260 | 4/2009 |
| JP | 2006041008 | 2/2006 |
| WO | 03032084 | 4/2003 |
| WO | 2008093915 | 8/2008 |

OTHER PUBLICATIONS

Alexander Jakob Dissertation: "Synthese und Reaktionsverhalten von Übergangsmetallkomplexen sowie deren Verwendung in der Homogenen Katalyse und Metallabscheidung". Technische Universitaet Chemnitz, Dec. 12, 2008, pp. 57 and 58.

English translation of pp. 57and 58: Alexander Jakob Dissertation: "Synthese und Reaktionsverhalten von Übergangsmetallkomplexen sowie deren Verwendung in der Homogenen Katalyse und Metallabscheidung". Technische Universitaet Chemnitz, Dec. 12, 2008.

Johannes Wilden Research project: DVS No. 10.060/IGF No. 16.279 N; Dept. of Joining and Coating Technology, Technische Universitaet Berlin, Apr. 6, 2011.

English translation of pp. 1-3: Johannes Wilden Research project: DVS No. 10.060/IGF No. 16.279 N; Dept. of Joining and Coating Technology, Technische Universitaet Berlin, Apr. 6, 2011.

Maruyama et al: "Silver nanosintering: a lead-free alternative to soldering", Applied Physics A Materials Science & Processing, Nov. 2008, vol. 93: 467-470.

* cited by examiner

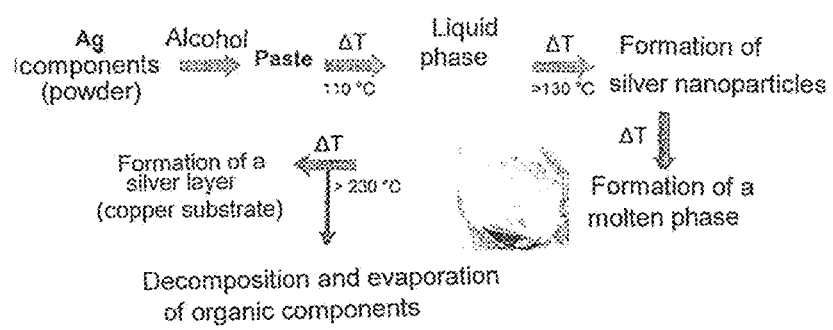
FIG. 1
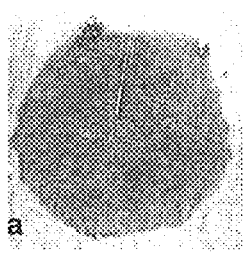 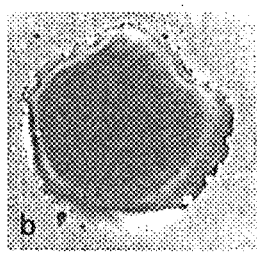 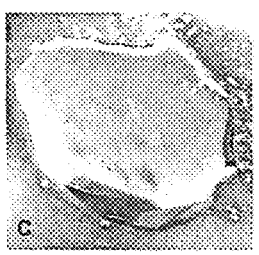 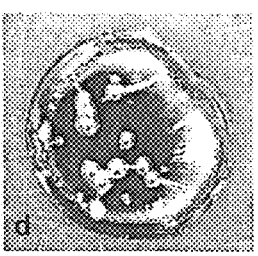
FIG. 2A    FIG. 2B    FIG. 2C    FIG. 2D

SOLDER MATERIAL, METHOD FOR THE PRODUCTION THEREOF AND USE THEREOF TO JOIN METAL SUBSTRATES WITHOUT PRESSURE

CROSS-REFERENCE TO RELATED APPLICATIONS

This application is a § 371 national stage entry of International Application No. PCT/EP2013/058105 filed Apr. 18, 2013, which claims priority to German Application No. 10 2012 206 587.3 filed Apr. 20, 2012 both of which are hereby incorporated by reference.

This invention relates to a solder material for producing silver layers and silver layers containing copper between metal or metalized substrates, in particular copper substrates. The solder material according to the invention can be used for joining at low temperatures. The silver solder according to the invention contains a metal-organic silver complex as a precursor, which forms silver nanoparticles only upon being heated and which forms a silver-metal molten phase over a temperature range of 20 to 40 units upon being heated further, which silver-metal molten phase can be used as a process window for joining already starting at 150° C., preferably starting at approximately 200° C.

Soft solders are generally used in areas where temperature-sensitive materials are to be joined. In particular, this concerns microelectronics and electrical engineering. In the past, solders containing lead were frequently used for this purpose. However, these are no longer permitted in many countries because of the health and environmental hazards they pose (e.g. EU Directive RoHS 2002/95/EC and WEEE 2002/96/EC which have been in force since Jan. 7, 2006). They therefore have to be replaced by other solder materials.

In addition, developments in electronics and microtechnology have been marked by the increasing miniaturization and greater complexity of components. This progressive miniaturization leads, in particular in power electronics, to a higher power density and, associated therewith, an increase in the operating temperature of the components. Higher powers as well as space-saving and weight-saving designs are making heat management in electronic housings difficult, resulting in the solder joints becoming excessively hot, possibly leading to localized overheating and, as a consequence, destruction of the solder joint. The alloys currently used are reaching their limits here in terms of their reliability.

The increasingly higher demands placed on electronic assemblies as the peak temperatures and ambient temperatures rise, and the directives concerning replacing lead-containing solders, which have been in force in the EU since July 2006, are the motivation for using new solder materials and technologies which guarantee a lasting reliable solder joint even under the stresses imposed by temperature variations.

The material silver is characterized by high electrical and thermal conductivity, so that heat is more effectively dissipated by a silver layer. However, silver has a melting point of 961° C. It cannot therefore be considered as a solid material for soft soldering. For this reason, the use of sintered silver has increasingly been considered in recent years.

It has long been known that isolated, small particles in the lower nanometer range melt at much lower temperatures than their bulk material ("melting temperature reduction"). Such a temperature reduction also applies to sintering. In this way it is possible to obtain silver layers with silver nanoparticles at low temperatures of 200 to 300° C.

Joining methods without pressure at these low sintering temperatures are described, for example, in DE 10 2007 046 901 A1, DE 10 2008 031 893 A1, DE 10 2009 040 076 A1 and DE 10 2009 040 078 A1.

Thus, DE 10 2007 046 901 A1 discloses a joining method in which elementary silver is formed from a silver precursor between the contact surfaces. The silver solder paste used contains silver oxide, silver lactate or silver carbonate, each of which form metal silver at temperatures below 300° C., in particular below 250° C., as the silver precursor. In addition, the silver solder contains a gel which is composed of carboxylic acid components and amine components, and a polar solvent, e.g. alcohol. The silver precursor and silver or copper particles having a size of between 0.2 and 5 μm are dispersed in the gel. DE 10 2008 031 893 A1 describes a similar method, wherein the silver solder paste used contains 2-20% by weight of the silver precursor.

DE 10 2009 040 076 A1 and DE 10 2009 040 078 A1 describe metal pastes for use for joining at temperatures below 200° C., which, in addition to metal particles coated with fatty acids, comprise sintering aids, solvents for dissolving these sintering aids and, optionally, a metal precursor. The sintering aids may, on the one hand, be salts or esters of organic acids having 1 to 4 carbon atoms or carbonyl compounds. These sintering aids release carbon monoxide during the sintering process, which is intended to reduce the at least partially oxidized surface located under the coating layer of the metal particles and is therefore intended to contribute to a reduction of the sintering temperature (DE 10 2009 040 078 A1). On the other hand, the sintering aids may be oxidizing agents such as organic peroxides, inorganic peroxides or inorganic acids which are intended to guarantee that the coating compounds on the metal particles are removed at temperatures below 200° C., so that the surfaces of the metal particles are already available for the sintering method at temperatures of below 200° C. (DE 10 2009 040 076 A1).

A bonding material made of metal (silver) precursor particles of 1 nm to 50 μm (metal oxide, metal carbonate or metal acetate) and a reducing agent is described in U.S. 2008/0156398 A1. The aim of the reducing agent is to cause the precursor to be reduced at a lower temperature than if it were only subjected to thermal decomposition. The application of pressure during joining results in a greater density of the sintered silver.

It was the object of this invention to provide an alternative nano solder, and a joining method using this nano solder which makes it possible for base metal surfaces, for example copper surfaces, to be joined in a stable manner to one another at low process temperatures of a maximum of 250° C. and without the application of pressure. The aim of this is to produce homogeneous contact layers having a low porosity and a high electrical and thermal conductivity.

The object of the invention is achieved according to the independent claims. Preferred embodiments are described in the dependent claims.

The solder material according to the invention contains
A) a metal-organic silver precursor which forms silver nanoparticles below 200° C. and has a metal molten phase over a temperature range from at least 20-40 K;
B) 25-150% by weight, preferably 60-90% by weight, based on the weight of the silver precursor A), of uncoated and agglomerated silver particles having an average particle diameter of the agglomerates of 100-

250 nm, which are completely fusible with the metal molten phase of the silver precursor A);

C) optionally, approx. 10% by weight, based on the weight of the silver precursor A), of a silver-organic and/or copper-organic complex which forms nanoparticles upon being heated and, optionally, an alcohol as a solvent.

In a preferred embodiment of the invention the metal-organic silver precursor used is a silver(I) carboxylate, with the exception of silver lactate, or a silver amine. Silver(I)-2-[2-(2-methoxyethoxy)ethoxy]acetate, which has the structural formula $AgO_2C(CH_2OCH_2)_3H$ and is a colorless solid, is preferably used as the silver(I) carboxylate. The production is described in Catal. Commun. 2009, 10, 437-441. Primary or secondary silver alkylamines having 8 to 12 carbon atoms, preferably a silver-n-alkylamine having 8 to 12 carbon atoms and, particularly preferably, silver-n-nonylamine, are considered as the silver amine.

The silver precursors used according to the invention have the special feature that they first melt into a liquid upon being heated. Upon being further heated, silver nanoparticles are formed in the liquid. When the temperature is further raised a metal molten phase is formed, which is or should be available over a range of 20 to 40 K. The organic fractions begin to decompose and volatilize. Reactive silver nanoparticles remain which sinter at continuing temperature supply, leaving behind a solid silver layer. These silver precursors contained in the nano solder of the invention must therefore have a solid-liquid-molten phase sequence at temperature supply, in order to be suitable according to the invention.

For example, the preferred metal-organic silver complex according to the invention silver(I)-2-[2-(2-methoxyethoxy)ethoxy]acetate forms the liquid phase at approx. 110° C., nanoparticles form starting at 130° C. and the molten phase forms starting at approx. 200° C. In principle it is possible already to join at this temperature. The organic components start decomposing and emitting exhaust gases at 220° C. The formed nanoparticles of this precursor have an average diameter of 2 to 15 nm. FIG. 1 shows a diagrammatic view of the temperature behavior of a silver solder according to the invention with this silver precursor.

The primary silver alkylamines which can also be used as a silver precursor A) according to the invention form the metal molten phase starting at a temperature of approx. 150° C.

To ensure that compact and homogeneous silver layers can be generated, the solder material of the invention contains nanoscale and submicroscopic, pure silver particles which are agglomerated as component B). The average particle diameter of the agglomerates is 100 to 250 nm. The silver particles are preferably obtained by reduction of silver nitrate with sodium borohydride. It has proved to be an advantage that these particles fuse completely with the molten phase of the silver precursor, so that homogeneously filled layers can be produced in this way.

In order to further increase the density of the silver layers formed, the solder material of the invention may optionally comprise approx. 10% by weight, based on the silver precursor A), of a silver-organic and/or copper-organic complex which has neither a liquid nor a molten phase, but which develops silver nanoparticles upon being heated. In a preferred embodiment of the invention a primary or secondary silver(I) alkanoate and/or a copper(II) alkanoate having 8 to 12 carbon atoms is used, preferably a silver(I) n-alkanoate and/or copper(II) n-alkanoate, particularly preferably silver-n-nonanoate, silver-n-decanoate, silver-n-dodecanoate, copper-n-nonanoate or copper-n-decanoate. By using a copper-n-alkanoate, it is possible to also introduce an increased amount of copper into the layer.

In one embodiment of the invention the solder material of the invention can contain an alcohol as a solvent. In this case, the solder material is a paste which contains so much alcohol that it is easy to spread. The alcohol is preferably selected from the group of $C_1$-$C_4$ alcohols, particularly preferably ethanol or methanol. Alternatively, it may also contain butyl glycol (2-butoxyethanol) as the alcohol. If butyl glycol is used, these molecules act as additional ligands for the nanoparticles. Elements to be joined with silver solder pastes of the invention, which contain butyl glycol as the alcohol, can be heated directly to the final temperature, since the boiling point of butyl glycol is 170° C. In the case of paste formulations with methanol or ethanol, the latter must be slowly evaporated, after that the sample to be joined can be heated directly to the final temperature.

In a preferred embodiment the silver solder pastes according to the invention contain silver precursor A) and agglomerated silver particles B) in the ratio of 1:0.7 to 1:1.5. The ratio of silver precursor A) to precursor C) is preferably 1:0.3 to 1:0.7.

It has been shown that very dense layers can be produced with the pastes according to the invention, if the pastes are slowly heated under argon (e.g. at 7 to 8° C./minute, or within 30 minutes) e.g. to above 250° C., prior to being used for joining. Following a brief holding time, e.g. 5 minutes, the pastes are allowed to cool, and the inert gas is removed after cooling to 100 to 150° C.

In a further embodiment of the invention, the solder material does not contain any alcohol, but the solder material is a powder which has been compacted (pressed) for better handling during joining. It can be compressed such that it retains its final form (pellet) and can therefore be easily used for joining. In a preferred embodiment the silver solder powders according to the invention contain silver precursor A) and agglomerated silver particles B) in the ratio of 1:0.25 to 1:1. The ratio of silver precursor A) to precursor C) is preferably 1:0.5 to 1:0.15, preferably 1:0.1. If precursor C) is a copper precursor, in order to increase the amount of copper in the layer, the proportion is 1:0.5.

The subject matter of this invention is also the production of the solder material according to the invention. In this case, the agglomerated silver nanoparticles B) described and, optionally, the silver-organic and/or copper-organic complex C), are added to the silver precursor A), which is generally a solid, and in order to produce a paste, only so much alcohol is added as is necessary to produce a highly viscous paste which is spreadable. The paste can then optionally be slowly heated under argon as an inert gas prior to being used for joining—as described above—to above the sintering temperature, whereby the paste is not sintered, however, but remains paste-like and spreadable. In order to produce the powdery solder material according to the invention, the components A) and B) and optionally C) are mixed together and no alcohol is added, but the resulting powder is compacted such that a manageable pellet is generated.

A further subject matter of this invention is the use of the solder material according to the invention for joining at least two metal or metalized substrates (base metals) provided for bonding, in particular copper substrates, without pressure, in that the spreadable silver solder paste or the compactable or compacted powder (pellet) is placed between the substrates to be joined, the alcohol is optionally evaporated as described above and the substrates to be joined are sintered with the solder material at a joining temperature in the range of 150 to 250° C., preferably 200 to 250° C., as a result of which elemental silver is formed between the contact surfaces. The sample is, in each case, heated directly to the final temperature, following optional evaporation of the alcohol, if there is any, and if any alcohol which is present is either methanol or ethanol. The joining temperature is preferably >220° C. to 250° C., particularly preferably 230 to 250° C. Silver layers with brief process and holding times can be obtained in the range starting from approx. 230° C. It has been shown that, for example, at a joining temperature of 250° C., the holding time in the furnace is approx. one hour, if the substrates to be joined are larger. In general, the holding time for joining with the solder material according to the invention is between 3 and 30 minutes. It is 3 to 5 minutes, but a maximum of 10 minutes, when dealing with miniaturized components.

The solder material according to the invention thus makes possible a joining method at relatively low temperatures which does not require the application of pressure and which produces dense and homogeneous layers. The silver layer, and join, thus formed only melts again if the melting temperature of the solid silver of 961° C. is attained. Therefore, the solder layers thus formed can be reliably preserved under thermal stresses.

This invention is essentially based on the use of the silver precursor A) according to the invention. Not only can the metal molten phase of the silver precursor according to the invention be advantageously used for inclusion of the silver particles, but so can the forming liquid phase which is produced before nanoparticles are formed. The liquid containing silver enters into an electrochemical exchange reaction with the copper-based material, so that the silver—as desired—is deposited as a metal and the copper is solubilized at the same time. As a result, both a uniform distribution of copper of at least 2 to 3 atom % in the entire silver layer and silver/copper phase boundaries with excellent adhesive strength are achieved.

The invention will be explained in more detail below by means of exemplary embodiments, but without limiting it to these, wherein FIG. 1 shows the temperature behavior of the paste according to Example 1.

FIGS. 2A, 2B, 2C and 2D show manifestations of a silver precursor drop (diameter approx. 10 mm) as the temperature increases: a) and b) formation of red nanoparticles in the (yellow) liquid phase at 140-145° C.; c) silver-metal-molten phase at 190° C.; d) degassing of the organic components at 230° C.;

EXAMPLE 1

Preparation of Solder Materials According to the Invention with silver(I)-2-[2-(2-methoxyethoxy)ethoxy]acetate as the Silver Precursor
Preparation of the Silver Precursor A):

10 g of silver nitrate (59 mmol) are dissolved in 8 ml of acetonitrile and added to 100 ml of ethanol. A mixture consisting of 13.36 g (11.5 ml, 75 mmol) of the corresponding acid 2-[2-(2-methoxyethoxy)ethoxy]acetic acid, 9.0 ml (6.57 g, 65 mmol) of triethylamine and 100 ml of ethanol is slowly added to this mixture and stirred. After 15 minutes of stirring and standing for 2 hours, the reaction product is cooled in an ice bath for 2 hours, during which time a precipitate is formed. This is filtered off and washed successively with ethanol and acetone.
Preparation of the Silver Precursor C):

The foregoing method is the same for the production of silver decanoate:

10 g of silver nitrate (in 8 ml of acetonitrile and 100 ml ethanol) and 12.92 g (75 mmol) of decanoic acid with 9.0 ml (65 mmol) of triethylamine and 150 ml of ethanol.
and copper decanoate:

10.0 g (74 mmol) of copper(II) chloride (in 10 ml. of distilled water and 100 ml of ethanol), and 25.84 g (150 mmol) of decanoic acid with 18.0 ml (130 mmol) of triethylamine and 150 ml of ethanol.
Preparation of the Silver Particles B):

3.03 g (80 mmol) of sodium borhydride are dissolved in 300 ml of distilled water and cooled in an ice bath for 30 minutes with stirring. Thereafter, 6.8 g (40 mmol) of silver nitrate, dissolved in 50 ml distilled water, are slowly dropped into this solution. The precipitate thus formed is filtered off and successively washed with ethanol and acetone.

a) A powder with the following proportions, based on the silver precursor A), is produced from the produced components A), B) and C):
Precursor A: silver particles B=1:0.7
Precursor A: precursor C=1:0.1

Figure 3:
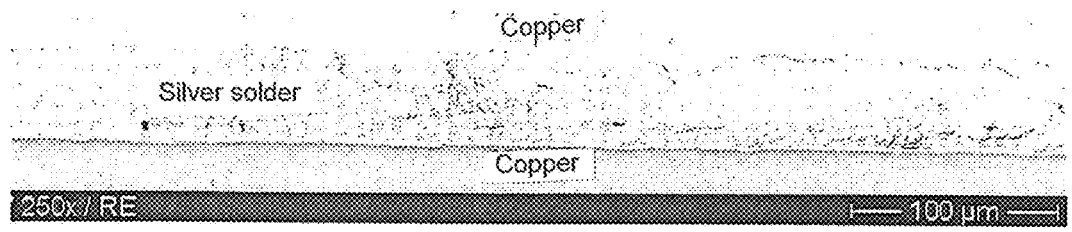
FIG. 3 shows a SEM image of a silver solder between copper parts, produced at 250° C., holding time of 1 hour.
Figure 4:
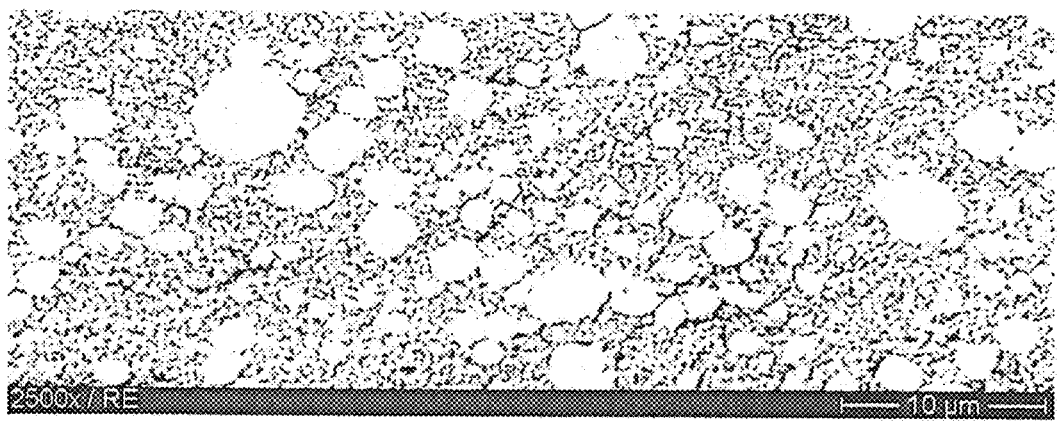
FIG. 4 shows an enlarged section of FIGS. 2A-2D.

FIGS. 3 and 4 show the SEM image of the silver layer produced with this powder.

b) A powder with the produced components A), B) and C) was produced with the following proportions:
Precursor A: silver particles B=1:0.4
Precursor A: copper precursor C=1:0.5

EXAMPLE 2

Joining of Copper Substrates with the Powder in Accordance with Example 1:

Preparation of the substrates: It was guaranteed that the surfaces were degreased by cleaning the copper parts in an ultrasonic bath with ethanol. The copper surfaces were then etched in citric acid in the conventional manner.

The easily compressible solder material was applied to the lower part of the prepared surfaces to be joined and the joining upper part was lightly pressed on, so that a complete contact between the joining material and the upper part could be assumed. The parts were then heated directly to the joining temperature of 250° C. Since the samples were made of solid copper parts, a holding time of 30 minutes at 250° C. was selected despite the good thermal conductivity of the copper base material. The samples were removed from the furnace and left to cool to room temperature.

As the powder contains the copper precursor C), the sample was placed in a furnace which can be operated under a blanket of nitrogen, in order to avoid oxidation effects of the copper precursor in the air.

Figure 5:
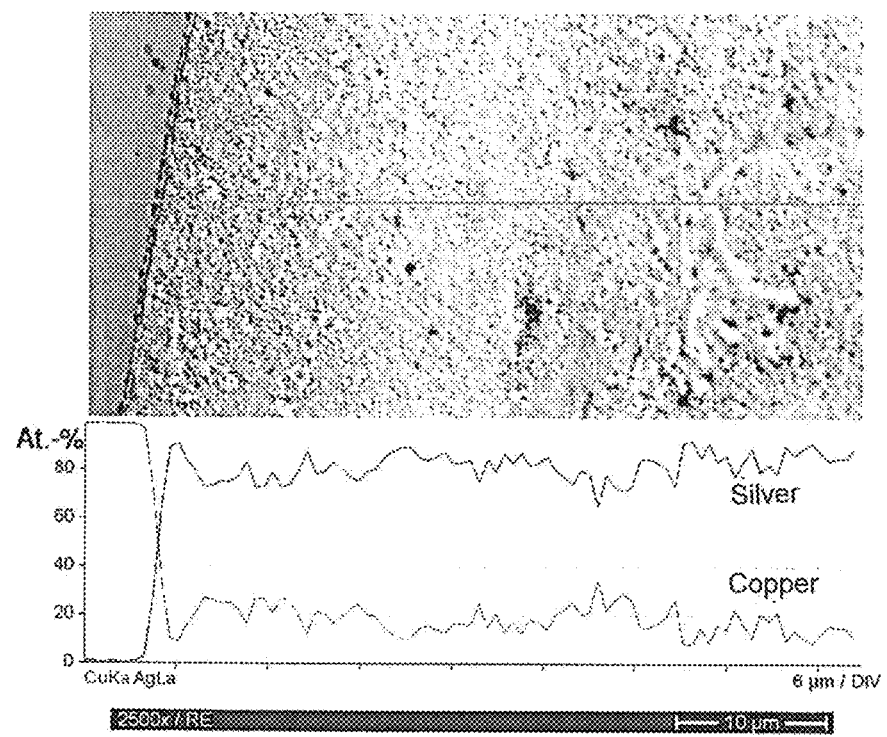
FIG. 5 shows a SEM image of a silver solder with a higher copper content between copper, produced at 250° C., holding time of 1 hour. The distribution of silver and copper in the layer is shown by the line scan.

FIG. 5 shows the SEM image of the layer produced with this copper-containing silver powder.

The invention claimed is:
1. A solder material containing
A) a metal-organic silver precursor which forms silver nanoparticles at temperatures below 200° C. and has a metal molten phase over a temperature range of at least 20-40 K wherein the metal-organic silver precursor is silver(I)-2-[2-(2-methoxyethoxy)ethoxy]acetate or a primary or secondary silver alkylamine having 8-12 carbon atoms;

B) 25-150% by weight, based on the weight of the silver precursor A), of uncoated and agglomerated silver particles with an average particle diameter of the agglomerates of 100-250 nm, which can be completely fused with the metal molten phase of the silver precursor A); and C) a precursor comprising a copper-organic complex which forms nanoparticles upon being heated,
wherein the copper-organic complex C) is a primary or secondary copper (II) alkanoate having 8-12 carbon atoms, and
wherein a ratio of the silver precursor A) to the precursor C) is 1:0.3 to 1:0.7, when the solder material is a paste which contains so much alcohol that it is easy to spread or
wherein a ratio of the silver precursor A) to the precursor C) is 1:0.15 to 1:0.5, when the solder material does not contain any alcohol, but the solder material is a powder.

2. The solder material according to claim 1, wherein the metal-organic silver precursor A) is silver(I)-2-[2-(2-methoxyethoxy)ethoxy]acetate.

3. The solder material according to claim 1, wherein the alcohol is a $C_1$-$C_4$ alcohol.

4. The solder material according to claim 1, wherein the paste obtained is heated under argon as an inert gas at 7 to 8° C. per minute to above the sintering temperature.

5. A method of using a solder material according to claim 1 to join at least two metal or metalized substrates provided for bonding without pressure, wherein the solder material is placed as a spreadable paste or compactable or compacted powder between the substrates to be joined, the alcohol is optionally evaporated and the substrates to be joined with the solder material are directly heated to a joining temperature in the range of 150-250° C. and sintered at this temperature, as a result of which elementary silver is formed between the contact surfaces.

6. The method according to claim 5, wherein the substrates to be joined are sintered with the applied solder material at a joining temperature in the range of 200° C. to 250° C.

7. The method according to claim 5 wherein the holding time on joining, as a function of the size of the substrates to be joined, is between 3 and 30 minutes.

8. The method according to claim 5, wherein the substrates to be joined are sintered with the applied solder material at a joining temperature in the range of >220° C. to 250° C.

9. The solder material of claim 1, wherein the precursor C) further comprises a silver-organic complex which forms nanoparticles upon being heated, wherein the silver-organic complex is a primary or secondary silver(I) alkanoate having 8-12 carbon atoms.

* * * * *